Figure 1:
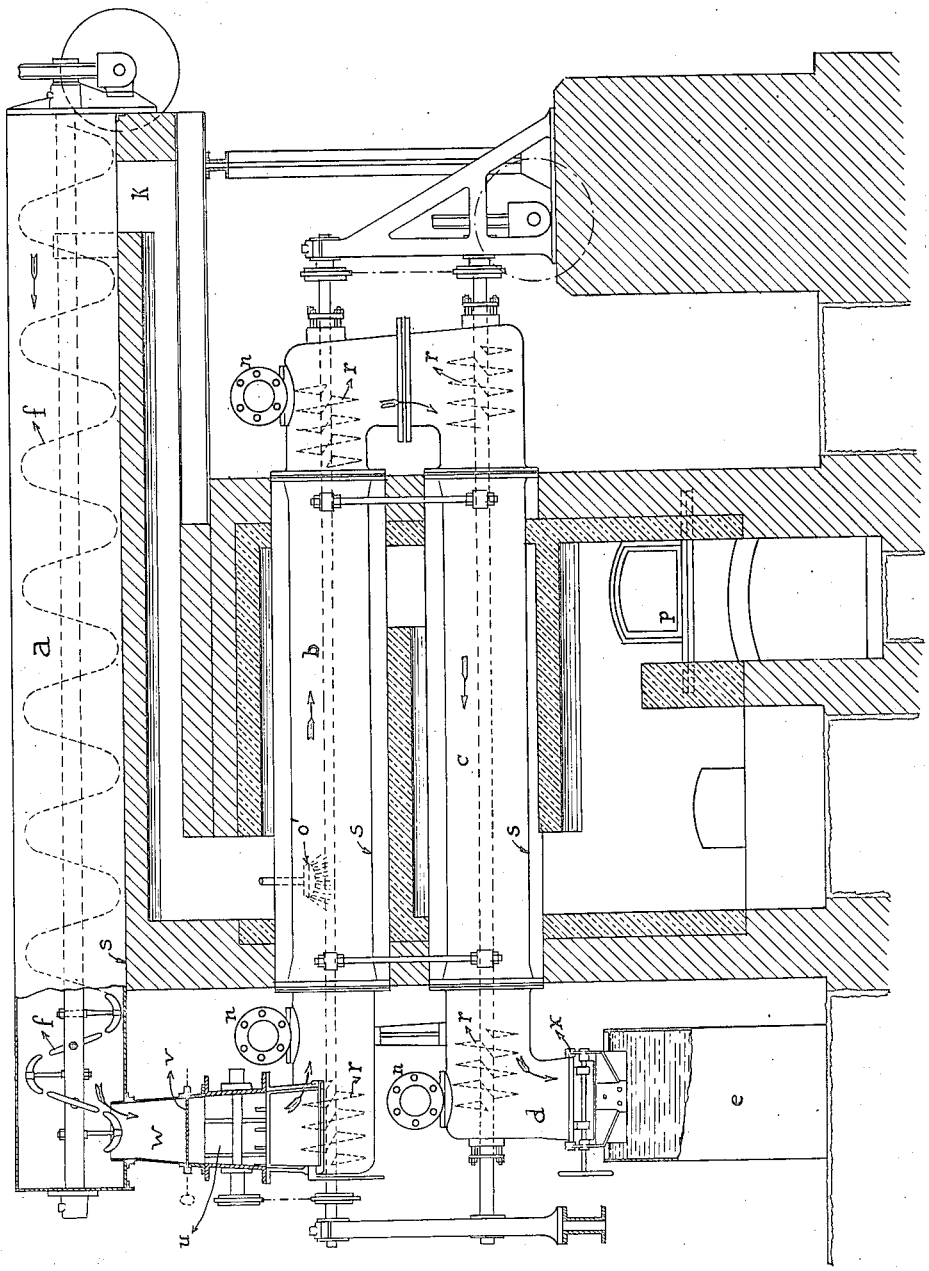

Patented Dec. 26, 1922.

1,440,195

UNITED STATES PATENT OFFICE.

ABRAHAM WIJNBERG, OF AMSTERDAM, NETHERLANDS, ASSIGNOR TO GENERAL NORIT COMPANY, LIMITED, OF AMSTERDAM, NETHERLANDS, A CORPORATION OF NETHERLANDS.

APPARATUS FOR DRYING, BURNING, AND RECOVERING FINELY-DIVIDED MATERIALS.

Application filed November 16, 1917. Serial No. 202,436.

(GRANTED UNDER THE PROVISIONS OF THE ACT OF MARCH 3, 1921, 41 STAT. L., 1313.)

*To all whom it may concern:*

Be it known that Dr. ABRAHAM WIJNBERG, diplomated technologe, teacher at the School for Sugar Industry, subject of the Queen of the Netherlands, residing at 567 Heerengracht, Amsterdam, Kingdom of the Netherlands, has invented certain new and useful Improvements in an Apparatus for Drying, Burning, and Recovering Finely-Divided Materials (for which I have filed applications in Germany February 25, 1916, and April 25, 1916, Patent No. 297,345; Austria, filed March 2, 1916, Patent No. 77,577; Hungary, filed March 7, 1916, Patent No. 70,419; Netherlands, filed March 12, 1916, application No. 6,838, and April 12, 1916, Patent No. 4,575; Great Britain, filed July 18, 1916, Patent No. 104,456; Switzerland, filed October 7, 1916, Patent No. 75,447; Sweden, July 16, 1917, Patent No. 49,464; Norway, July 25, 1917, Patent No. 29,647), of which the following is a specification.

The object of my present invention is to provide an improved apparatus for drying, burning, and recovering in a pure form, finely divided materials, and particularly for regenerating finely divided materials, such as bone char or decolorizing carbon, which have been used for the purification or filtration of liquors or liquids. When such finely divided material is treated, it presents peculiar difficulties on account of forming a very dense and practically impervious mass, whereas granular materials are of a relatively loose character and therefore can be dried, burned, and otherwise treated much more readily and efficiently than finely divided substances. These latter substances oppose a very considerable resistance to the escape of gases or vapors formed during the treatment, and furthermore cannot be fed merely by gravity (as granular substances can), and also are difficult to heat and burn uniformly. The result is that, if finely divided materials are burned in apparatus of the same kind as the ones which have been customary for the treatment of granular materials, a very imperfect yield is obtained, that is to say, in the case of regeneration, only a portion of the material is recovered in serviceable form, there being a considerable loss; moreover, there is great danger of explosion owing to the retention of a portion of the gases or vapors.

In order to recover practically all the substances or material under treatment, I subject such material to a gradually increasing heat, in stages, by means of an apparatus of special character, as described hereinafter, said apparatus, in addition to the heating section, comprising a condenser or cooling section to which I transfer, during the heating treatment, gases or vapors which contain or envelop, particles of the material under treatment, and this portion of the material, suspended or enveloped in the gases, would otherwise be lost. I thus recover separately, such enveloped particles of the material, besides obtaining, in the heating section of the apparatus, such main portion of the material as has not been carried away by the gases.

It will be understood that my apparatus is intended particularly for the treatment of finely divided materials, either of a carbonaceous character (to be brought or restored to a state of great purity by the burning operation), or substances containing no carbon in themselves (say, kieselguhr or fuller's earth), and subjected to the treatment for the removal of impurities.

By the term "finely divided material" I wish to designate in general, materials of the character above referred to when they are of a very small size, e. g. such materials of which a great part, say 25%, can pass, in a dry state, through a sieve with meshes of a size of two mm. square.

I wish it, however, to be understood that I do not limit myself to any particular fineness.

The meaning of the term "burning or reburning" as it is used in this specification should be interpreted as follows: For carbon or carbonaceous matter, carbonizing under practical exclusion of air or in the presence of indifferent or other suitable gases so as to avoid great losses of the material through oxidation, while for other materials which do not contain carbon or carbonaceous matter which has necessarily to be left in existence, the burning may be done in the presence of air or even more strongly oxidizing gases.

Figure 2:
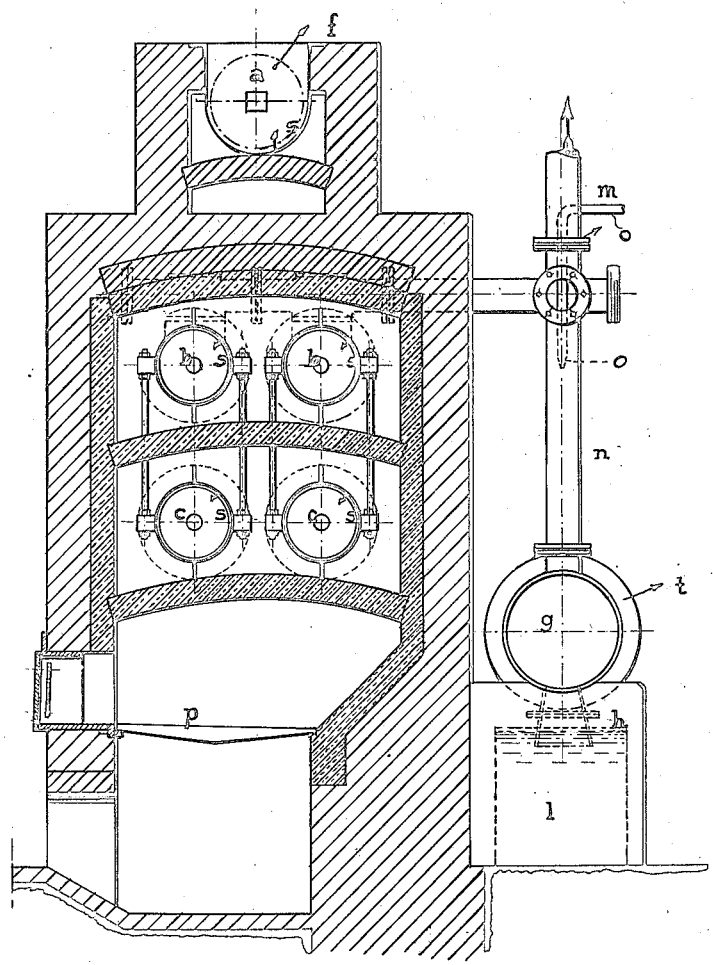
Figure 3:
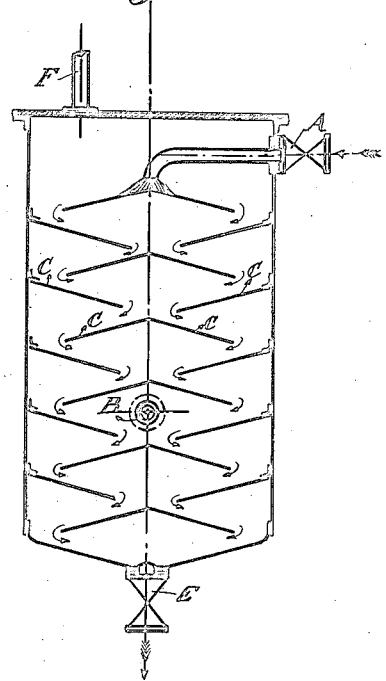

An embodiment of my invention is represented in the annexed drawing, in which Fig. 1 is a longitudinal section, and Fig. 2 a cross section of the same; Fig. 3 is a vertical section of a condenser.

Of the two apparatuses mentioned above, the first, serving for burning the material to be treated, is composed of the following parts:

Of a drying trough or open conveyor $a$ provided with arms $f$, of burning vessels or retorts $b$ and $c$ provided with screw conveyors $r$ and suitably connected with each other; of a collector $e$. The arms $f$ and screws $r$ of the conveyor $a$ and of the retorts $b$ and $c$ respectively serve to carry forward mechanically the material to be dried and burned, first through the open conveyor $a$ in which e. g. the decolorizing carbon is partly dried, then through the upper vessel or upper retort $b$ where it is further dried and then burned, and thence through the lower vessel $c$ where the burning is continued, until it reaches the far end of the lower reburning vessel, where it drops into the closed or open receptacle or collector $e$ filled with a suitable liquid, for instance water.

The screws $r$ and arms $f$ mentioned above also serve to mechanically subject all particles of the material to be treated, to an equal and intimate action of the applied heat, by mixing the said material while conveying it forward, and by spreading it gradually and continuously in a thin layer over the inner surface of the heated walls $s$ of the drying conveyor $a$ and of the burning vessels $b$ and $c$. By keeping the finely divided material spread in a thin layer over the inside of the burning vessels the gases and vapors formed are enabled to escape freely and easily, and explosions are thus avoided.

A free escape is afforded to the steam or vapors evolved from the moist material as it travels along the conveyor trough or drier $a$. The heat applied is gradually increased in intensity; it is lowest under the conveyor $a$, in which the material under treatment is subjected to drying only, higher under the upper retort $b$, and highest under the lower retort $c$. A suitable temperature is about 600° centrigrade under retort $c$, while under the conveyor $a$ it is about 200° to 400° centigrade. The temperature to be applied may be greatly varied and depends on the material to be treated, on the object aimed at, on the results which are desired etc. and also on the materials of which the drying and burning vessels are made, namely whether or not these could stand the temperature desired to be applied.

For conveying the materials to be dried and burned, any other suitable mechanism than those described above and shown in the annexed drawing, and made of any suitable material, may be used.

The retorts $b$ and $c$, especially the lower retorts $c$, if made, say, of cast iron, may be protected by a suitable lining or otherwise against direct contact with the flames, in order to avoid burning or otherwise injuring the iron vessels.

During the drying and burning, in the open conveyor $a$, and also in the closed retorts $b$ and $c$, gases are formed from the destruction of organic matter by the heat applied, and vapors from the generation of steam out of the moisture present in the dried and burned material. These gases and vapors carry away, as already mentioned, considerable amounts of the material to be burned, in fact most of the lighter parts of the same, while the heavier particles of the said material are carried forward by the screws $r$ of the retorts $b$ and $c$ to the receptacle $e$ at the end of the lower reburning vessel $c$.

The second of the two apparatuses mentioned above, consists of one or more retorts or vessels $n$ suitably arranged, serving for the conduction of the gases or vapors developed by and during the drying and burning process; the said apparatus further consists of the so-called condenser $g$ into which said gases and vapors are conducted; of the collector $l$ and the pipe $m$. The outer walls $t$ of the condenser being cooled by exposure to the open air, or the condenser being cooled in some other way, say by the use of cold water sprayed into or upon the condenser, the condensible gases and steam or vapors developed during the drying and burning process are condensed, and this condensation causes the envelopment and precipitation of the solid material suspended in the said gases and vapors. The condenser also serves to collect the precipitated particles of the treated material recovered by the said condensation process. As a result of the condensation, the recovered material is obtained partly as a thick and partly as a thin paste. The thick paste of the recovered material is collected by cleaning out the condenser $g$, while the thin paste is collected by conducting it through an opening $h$ in the bottom of the condenser to either a closed or a watersealed receptacle $l$.

Any kind of suitable closed or open receptacles which may be made of any suitable material, may be used for collecting the particles of the treated material, coming from either the lower reburning vessel of the kiln or from the condenser. Closed receptacles also, for instance receptacles filled with an indifferent gas may be used, or open receptacles filled with water or any other suitable liquid or like substance, the idea being only to avoid the oxidation of the burned hot carbon or carbonaceous material—provided the treated material contain such—by contact with or exposure to the open air.

The connections made by the pipes $n$, made e. g. of cast iron, may also be effected in any other suitable way and by any other suitable means, using any other suitable materials. The pipe $m$ which is placed above the condenser $g$ and made e. g. of steel, serves to conduct to the open air the non-condensible gases and those condensible gases and steam vapors which have escaped condensation. This pipe $m$ may also be made of any other suitable material.

The general process of burning and drying when working the apparatus shown in the appended drawings may be described as follows:

The material to be burned, either preparatory to its first use or for regeneration, is continuously conveyed by the open screw conveyor $a$, where it is partly dried, to a feed funnel $w$ provided with a breaker $u$, say a rotary breaker of ordinary construction (to break big cakes if any), and also provided with a valve $v$, preferably a slide valve, to shut off the air from the reburning kiln or vessels $b$ and $c$ when the burning or reburning is to be discontinued or stopped. The said funnel $w$ leads the partly dried material continuously to the proper reburning kilns or vessels $b$ and $c$ which are provided with screw-conveyors $r$. The drying conveyor $a$ and the reburning retorts or vessels $b$ and $c$, which may be made in any suitable form and of any suitable material, e. g. of cast iron, graphite, fire-clay, silicate, etc., and may be open or closed, are provided either with arms or screws or with any other suitable mechanical means to convey the material to be burned towards the collecting receptacle $e$.

The feed funnel $w$ which is preferably small at the top and wide at the bottom, may be provided with other feeding means instead of a breaker.

In some cases if the material to be treated is rather wet or sticky, it is of great advantage to have the screw conveyor $r$ of the upper retort or vessel $b$ replaced partly or wholly with conveying arms such as are used in the drying trough $a$ or with other suitable conveying means.

The burned or reburned material is conveyed continuously through the tube or funnel $d$ into the receptacle $e$. This funnel $d$ is also provided with a valve $x$, preferably a slide valve, which serves to shut off the air when the burning or reburning is to be stopped or discontinued for a greater or shorter length of time. This funnel $d$ may also be provided with a screw conveyor such as above described. In this case the said screw serves to provide an easy and positive mechanical discharge, while the screw blades also prevent the steam generated by the dropping of the hot material into the water contained in the collector $e$—if water is used —from rising into the lower burning retort $c$.

The burning or reburning proper of the treated material in the retorts or vessels $b$ and $c$ is carried out practically under exclusion of air; the burning or reburning may, however, also take place in the presence of indifferent gases as for instance $CO_2$ or the like, when materials containing carbon or carbonaceous matter or other oxidizable matter are treated. The aim is to prevent as much as possible, the oxidation of carbon or carbonaceous matter of the treated material if such oxidation is undesirable.

Small air-leaks will not do much harm, as a matter of fact, they sometimes have the advantage of assisting in burning away such organic matter as is present in the material under treatment and has to be removed.

If the material to be burned or reburned is not a carbon or charcoal or animal char, or does not contain carbonaceous matter, or is non-oxidizable, as for instance kieselguhr, fuller's earth, etc., prevention of air-leaks is not only without advantage, but in such cases the presence of air may even be of great advantage.

The number of drying conveyors and the number of burning vessels or retorts may be varied, and is not restricted to the use of one and two respectively as in the example illustrated by the annexed drawing. The sectional view Fig. 2 represents one drying conveyor $a$ feeding two sets of two retorts ($b$ and $c$) each.

Two or more drying conveyors may be suitably arranged and connected under and next to each other. With such arrangements the capacity of the kiln is enlarged and drying and burning is effected more thoroughly. The proper burning and reburning lies in properly drying and properly burning the material, and this depends on the temperature applied, and upon the length of time of the drying and burning or reburning. The longer the path through which the material to be treated is made to travel, that is, the longer the material is exposed to the applied heat to be dried and burned or reburned, the better is the result.

When cleaning out the inside of the condenser, the material removed therefrom may be brought directly into the drying conveyor $a$. The paste coming out of the condenser into the receptacle $l$ is generally too thin and contains too much moisture to admit of its being brought directly to the conveyor $a$. This thin paste, previous to being dried in the conveyor $a$, must be freed from most of its moisture in any suitable way, say by means of a filter press or the like.

The condenser $g$ or the pipes $n$ or the retorts $b$ and $c$ may be provided with an injector (indicated by $o$ at one of the pipes $n$ in Fig. 2, and by $o'$ at one of the retorts $b$ in Fig. 1) for the introduction of a fine spray of water, steam, or other condensible vapors or gases, to assist in the precipitation of the material suspended in the gases and vapors developed during and by the drying and burning process or carried away otherwise.

The heating of the conveyor $a$ for drying the material and the heating of the burning retorts or vessels $b$ and $c$ for burning the material under treatment, may be effected in any suitable way, using any suitable fuel and either direct or indirect heating. Superheated steam, for instance under pressure, may be applied.

In the example represented in the annexed drawing, I have shown indirect heating of the material under treatment, the burning retorts or vessels being heated by means of a coal-fire on an iron grate $p$. The hot gases of this coal-fire, which have first been used for heating the burning retorts $b$ and $c$, may, prior to their escape into the open air through the chimney $k$, be utilized for the preliminary drying of the material which is to be subjected to burning subsequently.

The condensation of the condensible part of the gases and vapors developed during the drying and burning process, may also be effected by leading said gases and vapors in any suitable way through any suitable liquid, say, water.

To accomplish this purpose, I may, for instance, use a condenser such as shown in Fig. 3.

The particles of the finely divided material contained in the said gases and vapors are then precipitated or carried down by the particular liquid used, and may be recovered by any suitable means, e. g. by using a suitable filter, filter-press, centrifugal separator or subsiding tank and the like.

In Fig. 3 of the annexed drawing, D represents the condenser, A the inlet of cold water or other liquids, B the inlet for the gases and vapors developed by and during the drying and burning process, this inlet being connected with the pipes $n$ of Figs. 1 and 2; and C represents the various conical baffle plates which serve for intimately mixing the said liquids with the said gases and vapors.

E represents the outlet for the mixture of the said liquids with the said gases and vapors. F represents the outlet for the non-condensible gases and vapors which are not removed through the outlet E.

The drying trough or receptacle $a$ and the burning retorts or vessels $b$ and $c$ may be imbedded in a suitable setting, say as shown in Figs. 1 and 2.

I claim as my invention:

1. In an apparatus for drying, burning, and recovering finely divided material such as powdered decolorizing carbon, a furnace, a plurality of retorts connected in tandem fashion and located at different distances from the combustion chamber of said furnace so as to be exposed to different degrees of heat, a condenser and a separate connection thereto from the upper spaces of each of the heated retorts.

2. In an apparatus for drying, burning, and recovering finely divided material such as powdered decolorizing carbon, a plurality of retorts connected in tandem fashion and adapted to receive successively the fine material to be treated, means for heating the successive retorts to different temperatures, a condenser and a separate connection thereto from the upper spaces of each of the heated retorts.

3. In an apparatus for drying, burning, and recovering finely-divided material such as powdered decolorizing carbon, a plurality of horizontal retorts connected in tandem fashion and adapted to receive successively the fine material to be treated, means for heating the successive retorts to different temperatures, and a condensing device, said device being connected with the upper spaces of each of said retorts, for precipitating and collecting the particles of the material carried off by the gases and vapors produced in said retorts.

4. In an apparatus for drying, burning, and recovering finely-divided material, a plurality of stationary horizontal retorts connected in tandem fashion and having means for mechanically transporting the material, means for heating the successive retorts to different temperatures, and a condensing device, said device being connected with the upper spaces of each of said retorts, for precipitating and collecting the particles of said material carried off by the gases and vapors produced in said retorts.

In testimony whereof, I affix my signature in the presence of two witnesses.

Dr. ABRAHAM WIJNBERG.

Witnesses:
D. KLEYN,
M. ALVARADO.